3,510,524
OXO PROCESS
John F. Deffner, Glenshaw, Edmond R. Tucci, Pittsburgh, and John V. Ward, Oakmont, Pa., assignors to Gulf Research & Development Company, Pittsburgh, Pa., a corporation of Delaware
No Drawing. Filed Aug. 23, 1966, Ser. No. 574,297
Int. Cl. C07c 45/02
U.S. Cl. 260—604         13 Claims

ABSTRACT OF THE DISCLOSURE

An Oxo process wherein an olefin is reacted with hydrogen and carbon monoxide in the presence of a cobalt carbonyl and a trioxaphospha-adamantane, preferably in the presence of a trialkyl amine.

---

This invention relates to an Oxo process or hydroformylation reaction, wherein hydrogen and carbon monoxide are added to an olefinic compound in the presence of a catalyst to obtain a mixture predominating in an aldehyde having one more carbon than said olefinic compound.

The catalyst generally employed for the hydroformylation reaction is a cobalt salt of a higher molecular weight fatty acid, such as octanoic, stearic, oleic, palmitic, naphthenic, etc. acids. Inorganic salts, such as cobalt carbonate, can also be used. Most of these salts are soluble in most of the olefinic feeds supplied to the hydroformylation reaction zone, but when they are not, they can be supplied in an inert, liquid hydrocarbon in which they are soluble, such as benzene, xylene, naphtha, heptane, decane, etc. Although the catalyst is supplied in the form of a cobalt salt to the hydroformylation reaction zone, under the conditions existing therein the salt reacts with carbon monoxide, preferably in the presence of hydrogen, to form a cobalt carbonyl, that is, one or more of the following: cobalt hydrocarbonyl, $HCo(CO)_4$; dicobalt octacarbonyl, $Co_2(CO)_8$; and/or tetracobalt dodecacarbonyl, $Co_4(CO)_{12}$. As defined herein "cobalt carbonyl" will refer to any one or all of the specific cobalt carbonyls referred to above. It is generally believed that the cobalt carbonyl is the active form of catalyst for the hydroformylation reaction.

Since cobalt carbonyls are thermally unstable and will easily decompose to elemental cobalt and carbon monoxide, it is necessary to maintain a high pressure of hydrogen and carbon monoxide in the hydroformylation reaction zone to inhibit such decomposition at the elevated temperatures existing in the hydroformylation reaction zone. At the end of the reaction period, the reaction product will consist largely of an aldehyde having one carbon more than the olefinic charge, plus unreacted hydrogen and carbon monoxide and some alcohol, corresponding to the aldehyde, carrying dissolved cobalt carbonyl. The unreacted hydrogen and carbon monoxide can rather easily be separated from the reaction product, for example, by flash distillation, but the cobalt carbonyl is removed only with difficulty. It is obvious that if the aldehyde product, as such, is desired, it would be necessary to remove cobalt carbonyl therefrom. In most cases the aldehyde is subjected to hydrogenation conditions in the presence of a hydrogenation catalyst, such as nickel, to convert the aldehyde to the corresponding alcohol. In such case it becomes even more imperative to remove cobalt carbonyl from the aldehyde being hydrogenated, since at the lower pressures employed in the hydrogenation reactor cobalt carbonyl will decompose to cobalt and carbon monoxide, the latter being undesirable in the hydrogenation reaction zone, since it has a tendency to poison the hydrogenation catalyst, such as nickel, which is generally used.

It has been customary, therefore, to subject the hydroformylation reaction product to a decobalting operation to remove cobalt carbonyl therefrom. This has generally involved subjecting the hydroformylation reaction product to temperature and pressure conditions favoring the decomposition of cobalt carbonyl to elemental cobalt and carbon monoxide. Elemental cobalt is difficult to remove from the hydroformylation reaction product, and it has a tendency to plug the lines leading to and from the decobalter and for some to find its way into the hydrogenation reactor. The removal of such cobalt adds significantly to the overal cost of the hydroformylation reaction. Cobalt so obtained, in addition, has to be discarded or, by a tedious procedure may, perhaps, be converted back to the original cobalt salt or cobalt carbonyl for use in the hydroformylation reaction zone.

We have found, however, that the above discussion can be avoided by employing in the hydroformylation reaction zone a cobalt catalyst such as defined above and a specific trioxaphospha-adamantane selected from the group consisting of 1,3,5,7-tetra(alkyl)-2,4,8-trioxa-6-phospha-adamantane and 1,3,5,7-tetra(aryl)-2,4,8-trioxa-6-phospha-adamantane having the following structural formula:

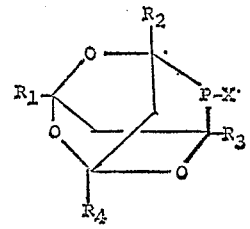

wherein $R_1$, $R_2$, $R_3$ and $R_4$, the same or different, are straight chain or branched alkyl substituents having from one to 16 carbon atoms, preferably one to 10 carbon atoms, or aryl substituents having from 6 to 16 carbon atoms, preferably from 6 to 10 carbon atoms and X is selected from the group consisting of hydrogen, fluorine, chlorine, bromine, iodine, aryl, alkyl, acyl, benzoyl, alkylcarbamyl or arylcarbamyl, preferably hydrogen or alkyl. Specific examples of alkyl substituents are methyl, ethyl, n-propyl, n-butyl, n-pentyl, n-hexyl, n-heptyl, n-octyl, n-decyl, n-dodecyl, n-tetradecyl, n-hexadecyl, isopropyl, 2-methylbutyl, 2-ethylpentyl, 3-butylhexyl, 4-pentyldecyl, 2,2'-dimethyldecyl, 3-methyl-4-ethyldecyl, 5-propylhexyl, 3-methyldodecyl, 6-ethyldodecyl, 3,3'-dimethyltetradecyl, 2-butylhexadecyl, etc., and of aryl substituents are phenyl, tolyl, xylyl, 1,3,5-trimethylphenyl, ethylphenyl, propylphenyl, butylphenyl, hexylphenyl, decylphenyl, dodecylphenyl, tetradecylphenyl, hexadecylphenyl, etc. Specific examples of such compounds that can be employed herein include 1,3,5,7-tetramethyl-2,4,8-trioxa-6-phospha-adamantane,
1,3,5,7-tetraethyl-2,4,8-trioxa-6-phospha-adamantane,
1,3,5,7-tetra(n-butyl)-2,4,8-trioxa-6-phospha-adamantane,
1,3,5,7-tetra(n-octyl)-2,4,8-trioxa-6-phospha-adamantane,
1,3,5,7-tetra(n-dodecyl)2,4,8-trioxa-6-phospha-adamantane,
1,3,5,7-tetra(n-tetradecyl)-2,4,8-trioxa-6-phospha-adamantane,
1,3,5,7-tetra(n-hexadecyl)-2,4,8-trioxa-6-phospha-adamantane,
1,3,5,7-tetra(isopropyl)-2,4,8-trioxa-6-phospha-adamantane, 1,3,5,7-tetra(isoamyl)-2,4,8-trioxa-6-phospha-adamantane,
1,3,5,7-tetra(3-heptyl)-2,4,8-trioxa-6-phospha-adamantane,
1,3,5,7-tetra(2-decyl)-2,4,8-trioxa-6-phospha-adamantane,
1,3,5,7-tetra(4-octyl)-2,4,8-trioxa-6-phospha-adamantane,
1,3,5,7-tetra(8-hexadecyl)-2,4,8-trioxa-6-phospha-adamantane,
1,3,5,7-tetraphenyl-2,4,8-trioxa-6-phospha-adamantane,
1,3,5,7-tetratolyl-2,4,8-trioxa-6-phospha-adamantane,
1,3,5,7-tetraxylyl-2,4,8-trioxa-6-phospha-adamantane,
1,3-dimethyl-5,7-diethyl-2,4,8-trioxa-6-phospha-adamantane,
1-methyl-3-ethyl-5-isopropyl-7-n-hexyl-2,4,8-trioxa-6-phospha-adamantaane,
1,3-dimethyl-5,7-diphenyl-2,4,8-trioxa-6-phospha-adamantane,
1,3,5-trimethyl-7-n-butyl-2,4,8-trioxa-6-phospha-adamantane,
1,3,5,7-tetramethyl-2,4,8-trioxa-6-chloro-6-phospha-adamantane,
1,3,5,7-tetraethyl-2,4,8-trioxa-6-acetyl-6-phospha-adamantane,
1,3,5-trfi(n-hexyl)-7-isopropyl-2,4,8-trioxa-6-benzoyl-6-phospha-adamantaane,
1,3,5,7-tetra(n-butyl)-2,4,8-trioxa-6-methyl-6-phospha-adamantane,
1,3,5,7-tetra(n-octyl)-2,4,8-trioxa-6-phenyl-6-phospha-adamantane,
1,3,5,7-tetra(isoamyl)-2,4,8-trioxa-6-ethylcarbamyl-6-phospha-adamantane, etc.

For purposes of simplicity herein, we shall refer throughout the specification, except in the specified examples, to these compounds as TPA. In the specific examples TPA will refer to the specific compound 1,3,5,7-tetramethyl-2,4,8-trioxa-6-phospha-adamantane. We believe that under the hydroformylation reaction conditions, the TPA, as a ligand, combines with the cobalt carbonyl and forms a complex therewith. By "ligand" we intend to include TPA's which contain an element with an electron pair that can form a coordination compound with a metal compound.

While we are not absolutely certain, we have reason to conclude that the complex formed between cobalt carbonyl and the above TPA's can be expressed by the following structural formula:

$$[Co(CO)_x(B)_y][Co(CO)_4]$$

wherein B represents the specific trioxaphospha-adamantane, as defined above, $x$ and $y$ are whole numbers from one to 4 and $x+y=5$. This complex is also a new composition of matter and forms part of the invention defined and claimed herein.

Although the complex defined above is thermally stable and can be used, as such, in a number of hydroformylation reactions without appreciable decomposition thereof, the complex can be rendered even more thermally stable by employing in admixture therewith a selected amount of a trialkyl amine having a pK$_a$ acidity of at least about +8 but no greater than about +15, preferably a pK$_a$ acidity of about +10 to about +13. By "pK$_a$ acidity" we mean to refer to the negative logarithm of the Bronsted acid dissociation constant. Weak bases have low pK$_a$ values, while strong bases have high pK$_a$ values. Although there may be some tendency for the trialkyl amine to complex with the cobalt carbonyl, we are of the opinion that only a small amount of such complexing takes place, since there is a greater tendency for a complex to form between cobalt carbonyl and the TPA, as set forth above. To the extent that a complex forms between cobalt carbonyl and the above amine, the same can be defined in accordance with the following structural formula:

$$[Co(CO)_x(R_3N)_y][Co(CO)_4]$$

wherein $x$ is a whole number from one to 4, $y$ is a whole number from one to 4, $x+y=5$ and R is an alkyl substituent of the amine as defined below.

By "trialkyl amine" that we employ herein for increased catalyst thermat stability, we intend to include those trialkyl amines whose individual alkyl substituents will have from one to 16 carbon atoms, preferably from one to about 12 carbon atoms, as well as those whose alkyl substituents carry one or more aldehydic, alcoholic, chlorine, fluorine or phenyl substituents thereon. Each of the individual alkyl substituents attached to the nitrogen atom of the amine, moreover, does not have to be similar to another substituent on the same amine. Specific amines that can be employed herein include trimethylamine, tri-n-butylamine, tri-n-hexylamine, tri-n-dodecylamine, tri-n-hexadecylamine, tribenzylamine, N,N-dimethylbenzylamine, N,N-dimethylnaphthylamine, N,N-methylbutylbenzylamine, N,N-butylethylbenzylamine, N,N-diethyldodecylamine, 2,2′,2″-iminotriethanol, 2,2′,2″-iminotriethylchloride, 4,4′,4″-iminotributylchloride, 1,1′,1″-iminotrimethylfluoride, 4,4′,4″-iminotributyraldehyde, 7,7′,7″-iminotriheptaldehyde, etc.

The cobalt complex defined above, that is, the complex formed between cobalt carbonyl and the TPA is easily obtained and employed herein. In a preferred embodiment it is obtained in situ in the hydroformylation reaction zone. Thus, one of the cobalt salts, for example, one of those defined above is introduced into the hydroformylation reaction zone along with one of the defined TPA's, the olefin to be subjected to hydroformylation reaction, hydrogen and carbon monoxide. Any olefinic compound that can be subjected to hydroformylation reaction and can be converted therein to aldehyde having one more carbon than said olefin can be employed. Representative examples of olefins that can be employed include propylene, butene-1, pentene-1, hexene-1, heptene-1, octene-1, decene-1, tetradecene-1, hexadecene-1, pentene-2, hexene-2, heptene-2, octene-2, 4-methyl-1-pentene, 2,4,4-trimethyl-1-pentene, 4-methyl-2-pentene, 2,6-dimethyl-3-heptene, cyclopentene, cyclohexene, cycloheptene, cyclooctene, 4-methyl-1-cyclohexene, etc. The molar ratio of hydrogen to carbon monoxide can be from about 5:1 to about 0.5:1, preferably from about 1:1 to about 2:1. The amount of hydrogen and carbon monoxide needed is at least that amount stoichiometrically required for addition to the olefinic compound, although from about 1½ to about 3 times the amount stoichiometrically required can be employed. The amount of TPA employed is from about 0.5 to about 10, preferably from about 2 to about 6 mols per mol of cobalt carbonyl. When an amine is employed it is also introduced into the reaction zone. From about 0.5 to about 10, preferably from about 2 to about 4 mols of amine per mol of cobalt carbonyl can be employed.

The reaction conditions in the hydroformylation reaction zone can vary over a wide range. Thus the temperature can be from about 200° to about 475° F., preferably from about 275° to about 325° F., while the pressure can be from about 500 to about 5000 pounds per square inch gauge, preferably from about 1000 to about 3000 pounds per square inch gauge. Reaction time can be from about 5 minutes to about 5 hours, but preferably will be from about 30 minutes to 120 minutes.

As a result of the above the cobalt salt will be converted to cobalt carbonyl and the latter, in turn, will complex with the TPA to form the new complex defined above, which becomes the hydroformylation reaction catalyst. At the end of the reaction period the converted product obtained will contain from about 10 to about 95 percent by weight of aldehyde having one more carbon than said olefinic charge and from about 5 to about 90 percent by weight of alcohol corresponding to said aldehyde. Also present with the converted product, of course, are unreacted hydrogen and carbon monoxide but also the cobalt carbonyl-TPA complex and the trialkyl amine, when the latter is also employed. The unreacted hydrogen and carbon monoxide can be recovered from the reaction product in any convenient manner, for example, by flashing at a temperature of about 25° to about 100° C. and a pressure of about 15 to about 500 pounds per square inch gauge. The aldehyde and alcohol present in the resulting reaction product can be removed therefrom in any convenient manner, for example, by subjecting the resulting reaction mixture to a temperature of about −30° to about 200° C. and a pressure of about 0.001 to about 760 millimeters absolute pressure. As a result of such action the aldehyde and alcohol are flashed off together or separately and left behind is the cobalt catalyst complex, trialkyl amine and/or solvent, when used and a small amount of polymerization product, which can be primarily acetals, hemiacetals and esters. A feature of the present process is that less polymer is formed herein than is generally formed during the conventional hydroformylation reaction process wherein uncomplexed cobalt carbonyl is employed as catalyst. Another additional, and quite important feature of the present process, is that the ratio of normal aldehyde and/or normal alcohol to iso aldehyde and/or iso alcohol is very high, from about 4:1 to about 6:1. Thus, normal aldehydes can be aldolized to yield 2-ethylhexanol which is useful as a plasticizer, or they can be hydrogenated to normal alcohols which are useful as commercial solvents or plasticizers. The cobalt carbonyl complex herein, along with the trialkyl amine, when used, can be recovered from the polymer in any convenient manner, for example, by ion exchange, solvent extraction or distillation, or can be permitted to remain in combination with the polymer, which can serve as solvent therefor, and be reused during the hydroformylation reaction as previosly defined. This procedure can be repeated many times, since the cobalt carbonyl complex defined herein is stable and will not decompose under the reaction and recovery conditions employed herein.

The cobalt carbonyl complex catalyst need not be formed in situ, as defined above, but can be preformed. Thus a mixture of cobalt carbonyl, such as defined above, can be combined with one of the TPA's, preferably in an inert solvent such as benzene, xylene, naphtha, heptane, decane, etc., at a temperature of about −30° to about 250° C., preferably about 25° to about 150° C., and a pressure of about 15 to about 5000 pounds per square inch gauge, preferably about 15 to about 100 pounds per square inch gauge for about one to about 120 minutes, preferably for about 10 to about 30 minutes. If an amine is to be used in combination with the complex so formed it can be added to the mixture along with the TPA or it can be added to the complex in the hydroformylation reaction zone. If desired, the cobalt carbonyl complex can be obtained as defined immediately above by substituting one of the previously defined cobalt salts for the cobalt carbonyl. In such case, however, at least about one to about 20 mols of carbon monoxide, preferably about one to about 8 mols of carbon monoxide, relative t the cobalt salt must also be present. The resulting mixture can be used as such in the hydroformylation reaction zone as catalyst, or if desired the cobalt carbonyl complex can be recovered from the mixture in any suitable manner, for example, by ion exchange, solvent extraction or distillation.

The process of this invention can further be illustrated by the following:

EXAMPLE I

A series of runs were made wherein olefins were subjected to hydroformylation reaction in the presence of the cobalt carbonyl complex defined above. Thus, into a 500 milliliter stainless steel autoclave there was placed 100 milliliters of benzene and 11 grams of a solution containing 8 milliliters of benzene and 4 milliliters of the cobalt salt of 2-ethylhexanoic acid. The autoclave was flushed with nitrogen gas and then pressured with synthesis gas containing 1.2 mols of hydrogen per mol of carbon monoxide to a pressure of 300 pounds per square inch gauge. The autoclave was depressured to atmospheric pressure and repressured with synthesis gas several times. The autoclave was finally pressured with synthesis gas to about 2300 pounds per square inch gauge at room temperature and then heated to 350° F. within 75 to 90 minutes. A temperature of 350° F. and a pressure of 3500 pounds were maintained for one hour. The autoclave was cooled to 120° F. and thereafter slowly depressured to atmospheric pressure.

To the dicobalt octacarbonyl thus formed in the autoclave there was added TPA, a trialkyl amine, when used, hydrogen and carbon monoxide in a molar ratio of 1.2:1 and the olefin. The reaction mixture was maintained at hydroformylation reaction temperature and pressure for one hour to obtain a reaction product containing substantial amounts of an aldehyde having one more carbon than the reactant olefin and the corresponding alcohol. At the end of the reaction period the autoclave was cooled to about 75° F. and then depressured to atmospheric pressure and the product analyzed for its composition. The results obtained are tabulated below in Tables I and II.

TABLE I

| | Run No. | | | | |
| --- | --- | --- | --- | --- | --- |
| | 1 | 2 | 3 | 4 | 5 |
| Temperature, °F | 300 | 300 | 320 | 320 | 320 |
| Pressure, p.s.i.g | 1,000 | 1,000 | 1,000 | 1,000 | 1,00 |
| Residence time, minutes | 60 | 60 | 60 | 60 | |
| Dicobalt octacarbonyl, grams | 2.0 | 2.0 | 2.0 | 2.0 | 2.0 |
| TPA,[1] grams | 3.0 | 3.0 | 3.0 | 6.0 | 5.3 |
| Tri-n-butyl amine, grams | None | 3.9 | 3.9 | 3.9 | 3.9 |
| Propylene, grams | 8.0 | 8.0 | 8.0 | 8.0 | 8.0 |
| Benzene, grams | 78 | 78 | 78 | 78 | 78 |
| Selectivity to normal product (aldehyde and alcohol), percent | 78 | 82 | 81 | 82 | 83 |
| Conversion, percent | 80 | 57 | 80 | 90 | 85 |

[1] 1,3,5,7-tetramethyl-2,4,8-trioxa-6-phospha-adamantane.

TABLE II

| | Run No. | | | | |
| --- | --- | --- | --- | --- | --- |
| | 6 | 7 | 8 | 9 | 10 |
| Temperature, °F | 350 | 320 | 320 | 320 | 320 |
| Pressure, p.s.i.g | 1,000 | 500 | 3,500 | 1,000 | 1,000 |
| Residence time, minutes | 60 | 60 | 60 | 60 | 60 |
| Dicobalt octacarbonyl, grams | 2.0 | 2.0 | 2.0 | 2.0 | 2.0 |
| TPA,[1] grams | 3.0 | 3.0 | 3.0 | 3.0 | 3.0 |
| Amine, grams | [2]3.9 | [2]3.9 | [2]3.9 | [3]4.5 | [4]4.5 |
| Olefin, grams | [5]8.0 | [5]8.0 | [5]60 | [6]21 | [5]8.0 |
| Benzene, grams | 78 | 78 | 78 | 78 | 78 |
| Selectivity to normal product (aldehyde and alcohol), percent | 78 | 80 | 80 | 79 | 81 |
| Conversion, percent | 94 | 93 | 74 | 49 | 92 |

[1] 1,3,5,7-tetramethyl-2,4,8-trioxa-6-phospha-adamantane.
[2] Tri-n-butyl amine.
[3] Tri-n-hexyl amine.
[4] N,N-dimethyl benzyl amine.
[5] Propylene.
[6] Hexene-1.

Obviously, other modifications and variations of the herein-disclosed invention may be resorted to without departing from the spirit or scope thereof. Accordingly, only such limitations on the invention should be imposed as are indicated in the appended claims.

We claim:

1. In a process wherein an olefinic hydrocarbon is subjected to hydroformylation with hydrogen and carbon monoxide at elevated temperatures of from about 200° to about 475° F. and elevated pressures from about 500 to about 5000 pounds per square inch gauge to obtain a product containing an aldehyde having one more carbon than said olefin, the improvement which comprises employing as catalyst in said hydroformylation reaction a complex having the following structural formulation:

[Co(CO)$_x$(B)$_y$][Co(CO)$_4$] wherein B represents a trioxaphospha-adamantane, $x$ and $y$ are whole numbers from 1 to 4 and $x+y=5$.

2. The process of claim 1 wherein said trioxaphospha-adamantane is 1,3,5,7 - tetra(alkyl) - 2,4,8 - trioxa - 6-phospha-adamantane.

3. The process of claim 1 wherein said trioxaphospha-adamantane is 1,3,5,7-tetra(aryl)-2,4,8-trioxa-6-phospha-adamantane.

4. The process of claim 1 wherein said trioxaphospha-adamantane is 1,3,5,7-tetramethyl-2,4,8-trioxa-6-phospha-adamantane.

5. The process of claim 1 wherein said trioxaphospha-adamantane is 1,3,5,7 - tetra(sec. alkyl) - 2,4.8-trioxa-6-phospha-adamantane.

6. The process of claim 1 wherein the reaction is carried out in the additional presence of a trialkyl amine.

7. The process of claim 1 wherein the reaction is carried out in the additional presence of a trialkyl amine having a pK$_n$ acidity of about +8 to about +15.

8. The process of claim 1 wherein the reaction is carried out in the additional presence of a trialkyl amine wherein the alkyl substituents on said trialkyl amine correspond to a substituent selected from the group consisting of aldehydic, alcoholic, chlorine, fluorine and phenyl substituents.

9. The process of claim 1 wherein the reaction is carried out in the additional presence of tri-n-butyl amine.

10. The process of claim 1 wherein the reaction is carried out in the additional presence of tri-n-hexyl amine.

11. The process of claim 1 wherein the reaction is carried out in the additional presence of N,N-dimethyl benzyl amine.

12. The process of claim 1 wherein the olefin is propylene.

13. The process of claim 1 wherein the cobalt carbonyl is dicobalt octacarbonyl.

References Cited

UNITED STATES PATENTS

| | | | |
|---|---|---|---|
| 3,278,612 | 10/1966 | Greene | 260—604 X |
| 3,257,459 | 6/1966 | Swakon et al. | 260—597 |
| 3,239,569 | 3/1966 | Slaugh et al. | 260—604 |
| 3,150,188 | 9/1964 | Eisenmann et al. | 260—604 X |

BERNARD HELFIN, Primary Examiner

R. H. LILES, Assistant Examiner

U.S. Cl. X.R.

252—431; 260—338, 598, 623, 638

PO-1050
(5/69)

UNITED STATES PATENT OFFICE
CERTIFICATE OF CORRECTION

Patent No. 3,510,524  Dated May 5, 1970

Inventor(s) John F. Deffner, Edmond R. Tucci, John V. Ward

It is certified that error appears in the above-identified patent and that said Letters Patent are hereby corrected as shown below:

Column 6, line 3 of TABLE I under Run No. 5, please insert "60".

SIGNED AND
SEALED
AUG 18 1970

(SEAL)
Attest:

Edward M. Fletcher, Jr.
Attesting Officer

WILLIAM E. SCHUYLER, JR.
Commissioner of Patents